United States Patent [19]

Hill et al.

[11] 4,125,524

[45] Nov. 14, 1978

[54] POLYESTER PROCESS

[75] Inventors: James C. Hill, Chesterfield; Walter R. Knox, St. Louis, both of Mo.

[73] Assignee: Monsanto Company, St. Louis, Mo.

[21] Appl. No.: 873,759

[22] Filed: Jan. 30, 1978

Related U.S. Application Data

[63] Continuation-in-part of Ser. No. 646,306, Jan. 2, 1976, abandoned.

[51] Int. Cl.$^2$ .................... C08G 63/00; C08F 18/14
[52] U.S. Cl. .................................................. 528/366
[58] Field of Search ................... 260/75 EP, 78.41; 526/11.2

[56] References Cited

U.S. PATENT DOCUMENTS

| | | | |
|---|---|---|---|
| 2,966,479 | 12/1960 | Fischer | 260/75 EP |
| 3,213,067 | 10/1965 | Pohl et al. | 260/75 EP |
| 3,374,208 | 3/1968 | Seiner et al. | 260/75 EP |
| 3,723,390 | 3/1973 | Carpenter et al. | 260/75 EP |
| 3,766,145 | 10/1973 | Thompson | 260/75 EP |

Primary Examiner—Lucille M. Phynes
Attorney, Agent, or Firm—James C. Logomasini; Paul L. Passley; Neal E. Willis

[57] ABSTRACT

The present invention provides a process for the production of a polyester having an acid number which is not greater than 65 which comprises reacting an acid anhydride with a monoterminal epoxide in such a way that a self-sustaining reaction is initiated within 200 seconds of the reactants being mixed together and said reaction results in the attainment of a maximum temperature in excess of 200° C within 200 seconds of initiation.

14 Claims, No Drawings

POLYESTER PROCESS

BACKGROUND OF THE INVENTION

This application is a continuation-in-part of co-pending application Ser. No. 646,306 filed Jan. 2, 1976, now abandoned.

This invention relates to polyesters and specifically polyesters obtained by the reaction of dicarboxylic acid anhydrides with epoxides.

It is well known that linear polyesters are obtained as a result of the reaction of an epoxide with a dicarboxylic acid anhydride. Early work on this subject is described in an article by R. F. Fischer in Journal of Polymer Science Vol. XLIV, pp. 155-172 (1960). In that article, Fischer examined the reaction of epoxides such as allyl glycidyl ether, epichlorohydrin, propylene oxide and vinylcyclohexene monoepoxide with anhydrides such as phthalic anhydride and maleic anhydride to produce linear polyesters. He found that the reaction was catalyzed by tertiary amines and quaternary salts, that the molecular weight of the polyester could be controlled by the presence of active hydrogen-containing compounds such as alcohol and water and that the reaction is independent of monomer concentration.

A similar reaction is described in U.S. Pat. No. 2,966,479 which describes heating a polybasic acid anhydride with a mono-epoxide in the presence of a catalyst which is a tertiary amine or a quaternary ammonium salt, under substantially anhydrous conditions and at a temperature of above 70° C.

The reaction producing linear polyesters can be more fully appreciated by reference to the following reaction formula. The anhydride is maleic anhydride though this is only for the sake of illustration, and it is understood that the maleic anhydride could be wholly or partially replaced by a different cyclic acid anhydride.

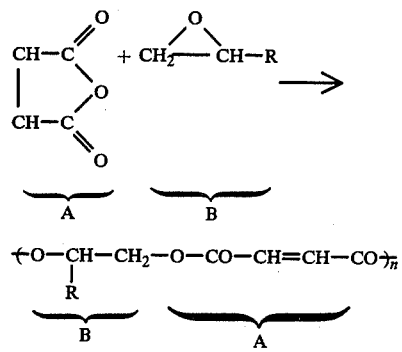

where R is a monovalent hydrocarbyl radical.

It will be obvious that, in theory at least, a monoepoxide reacted with an anhydride will produce a linear product having an +ABABAB+ type structure. However, in practice it is necessary to take steps to avoid or minimize consecutive addition of epoxy units which gives rise to polyether segments. In addition when maleic anhydride is used special techniques must be used to avoid crosslinking via the double bond of the anhydride. Polyether segments usually lead to soft, rubbery polymers and cross-linking via the double bonds of the maleic anhydride gives rise to polyesters that are black weak foams (the result of partial decomposition of anhydride) with no commercial value.

The properties of linear polyesters vary according to the epoxide used. With alkylene oxides such as ethylene oxide the polyesters have a much lower polymer melt temperature than with e.g., styrene oxide. Likewise polyesters made with succinic or glutaric anhydrides have lower polymer melt temperatures than those made using maleic or phthalic anhydrides.

Linear polyesters of this type incorporating an unsaturated anhydride such as maleic anhydride have found significant commercial applications in the form of solutions in styrene which are copolymerized in the presence of glass fibers to provide the well-known fiberglass-type products.

Typical of the processes in this field are those described in U.S. Pat. No. 3,822,325 and U.S. Pat. No. 3,723,390. Both describe processes in which the addition of the epoxide is staged to minimize the formation of polyether segments.

Water has been variously described as an initiator and a retardant for the reaction. For example, in U.S. Pat. No. 3,374,208 the use of certain metal salts as catalysts and the replacement of water with glycol as initiator are recommended.

A large number of possible catalysts for the process have been described. In U.S. Pat. No. 3,213,067, for example, the patentee recites alkali metal salts and hydroxides, alkaline earth metal salts and hyroxides, and organic amine salts and hydroxides. In U.S. Pat. No. 2,966,479 the specified catalysts are tertiary amines and quaternary ammonium salts.

The reaction of epoxide with anhydride has been observed to be exothermic and in a number of patents, specific mention is made of the need to control the temperature to avoid discoloration. Thus, U.S. Pat. No. 3,822,325, U.S. Pat. No. 3,483,169, U.S. Pat. No. 3,213,067 and U.S. Pat. No. 2,966,479, for example, all set specific temperature ranges within which the reaction must be conducted.

It has now been found that when conducted in a certain novel manner, the reaction between an anhydride of a dicarboxylic acid and a mono-terminal epoxide can be controlled to give a substantially quantitative yield of a polyester with a low acid number without at the same time becoming cross-linked and therefore insoluble in organic solvents such as acetone. Moreover, it has been found that the above results can be achieved in a fraction of the time taken by prior art processes not involving complicated multistage reactions.

SUMMARY OF THE INVENTION

The present invention provides a process for the production of a polyester having an acid number which is not greater than 65 which comprises;

a. forming a mixture of a diacid anhydride with a mono-terminal epoxide in an anhydride to epoxide molar ratio of from 1:1 to 1:1.5 in the presence of from 0.2 to 0.0001 mole per mole of anhydride of a catalytically effective quaternay salt and, optionally, in the presence of up to 0.2 mole of water per mole of anhydride, b. initiating a non-self-sustaining exothermic reaction between the epoxide and the anhydride, c. raising the temperature of the mixture to a point at which the exothermic reaction becomes self-sustaining, and d. controlling the reaction conditions such that the temperature of the reaction mixture is not reduced until a maximum temperature in excess of 200° C.

has been reached in the reaction mixture and substantially all available monomer has been consumed;

the time spent in stages b and c combined being less than 200 sec. and the time taken in stage d from the initiation of the self-sustaining exothermic reaction to the attainment of the maximum temperature being also less than 200 seconds.

The reaction between the epoxide and the anhydride proceeds in two stages. In the first stage, the reaction is mildly exothermic but non-self-sustaining. By this is meant that if external heat to the reaction mixture is removed, the reaction would slow down and cease leaving a substantial proportion of the monomer unreacted.

The second stage of the reaction begins when the reaction mixture reaches a point at which, if external heat to the reaction mixture is removed, it would nevertheless continue to evolve heat until a peak temperature is reached, the rate of evolution of heat by the exothermic reaction has begun to decrease and substantially all available monomer consumed and only thereafter would the temperature of the reaction mixture drop. At this point the reaction becomes "self-sustaining" as the term is used herein.

It is recognized that if the reaction were to be carried out in a very thin mold or in the presence of a large amount of inert material that could act as a heat sink, the amount of surface heat lost through the walls of the mold could necessitate the addition of heat to ensure that the reaction proceeds to completion. The term "self-sustaining" therefore must be understood to refer to the nature of the reaction when performed using 5.00 gm of given reaction mixture in a 20mm × 150mm pyrex glass test tube having a thickness of 1.2mm.

The time periods specified above are important since during the non-self-sustaining reaction stage, many relatively short polymer chains are being formed and these apparently do not combine to any very great extent after the rapid self-sustaining reaction is initiated. Thus, if the first stage is prolonged a large number of polymer chains are formed and the size of the individual polymer molecules in the final product is much reduced. The consequence is a lower polymer melt temperature and higher acid number and reduced properties in the final polymer. It is therefore critical that the chain forming reaction proceed as quickly as possible and this is an important characteristic of the process of the invention. Prolongation of the time to reach to the maximum temperature likewise results in shorter chains and higher acid number.

Whenever referred to herein the acid number is understood to mean the mg. of potassium hydroxide needed to neutralize free (residual or terminal) acid groups and residual anhydride in one gram of the polymer and the acid number and the polymer melt temperature are measured by the methods described in "Preparative Methods of Polymer Chemistry" by Sorenson and Campbell (Interscience Publishers, Inc., 1961).

The term quaternary salt is intended to cover quaternary ammonium and quaternary phosphonium salts as well as mixtures of compounds which would form a quaternary salt in situ, such as a mixture of a tertiary amine and a $C_1$-$C_{10}$ alkyl or aralkyl halide.

By the term "catalytically effective quaternary salt" is to be understood a quaternary salt that, when mixed with styrene oxide and phthalic anhydride in an oxide to anhydride to salt molar ratio of 1.3:1.0:0.17 and heated at 180° C. and atmospheric pressure initiates an exothermic reaction in less than 160 seconds which reaches a peak temperature of from 229° to 237° C. in a period of from 18 to 45 seconds after initiation to yield a linear polyester having a polymer melt temperature of at least 50° C. and an acid number not greater than 65.

It is already known that the reaction between anhydride and epoxide is exothermic. It has not, however, been noted heretofore that when the reaction mixture is heated rapidly to a point at which a highly exothermic self-sustaining reaction is initiated, the final polyester product has an acid number which is directly related to the time taken to initiate the exothermic reaction after mixing the reactants.

Moreover, it has been noted that provided the rate of temperature change during the exothermic reaction is not reversed until after a peak temperature in excess of 200° C. is reached and substantially all available monomer has been consumed, and said peak temperature is reached in less than 200 seconds, the resultant polymer will have a relatively high polymer melt temperature and a low acid number.

The rapid initiation and completion of the process of the invention is in marked contrast to prior art processes which are described as taking, in most cases, several hours. This is because, rather than encouraging the inception of the self-sustaining exothermic reaction and thereafter allowing it to proceed without applying cooling, the reaction temperature is only allowed to rise slowly to a maximum that is kept as low as is feasible.

It has, however, been found that the acid number of the final product is directly dependent on the time taken after initiation of a non-self-sustaining reaction to reach the initiation of the self-sustaining exothermic reaction. This is quite contrary to the teachings in the prior art which recommend controlled reactions lasting several hours to avoid by-products and discoloration.

A further advantage of the present invention lies in the fact that, where the anhydride is maleic anhydride, it is possible to cause isomerization of the maleic group to fumarate to take place during the reaction itself instead of performing the isomerization on the polyester product. Isomerization is generally considered desirable since the fumarate polyester is found to have a higher polymer melt temperature than the corresponding maleate polyester. Conventionally this is done on the finished polyester using a catalyst such as morpholine because the rapid reaction as is explained in U.S. Pat. No. 3,723,390 (Col. 6, lines 41-63) is linked to limited success in achieving isomerization. Surprisingly, with the present process a considerable degree of isomerization can be achieved by incorporating the isomerization catalyst in the reaction mixture itself. The polyester can of course be isomerized in the conventional way if desired.

The epoxide component of the reaction mixture is one having the structure

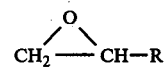

wherein R is hydrogen, an alkyl, aryl or alkaryl radical. Examples of suitable R groups include alkyl groups such as methyl, ethyl, propyl and aromatic groups such as benzyl, toluyl, phenyl and naphthyl as well as ring or side-chain-substituted groups of such aromatic groups.

The most readily available and in many ways the most convenient members of these groups are ethylene oxide, propylene oxide and styrene oxide and these are in fact the preferred epoxides for use in the process of the invention. As will be appreciated with some aliphatic epoxides it will be necessary to provide that the reaction be carried out under pressure to prevent excessive loss through volatilization at the reaction temperatures encountered.

The anhydride component is an anhydride of a dicarboxylic acid having an anhydride group represented by the generalized formula

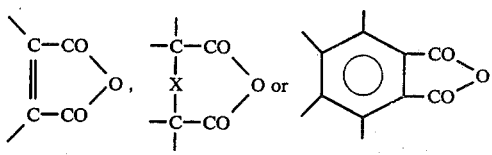

wherein —X— can be a single bond or an alkylene group having 1 to 6 carbon atoms.

Typical anhydrides include maleic anhydride, succinic anhydride, glutaric anhydride, adipic anhydride, and phthalic anhydride with maleic and, to a lesser extent, phthalic being particularly preferred.

The catalyst, under the influence of which the reaction takes place, is a quaternary salt having the formula $R_4MX$ where M is N or P, R are the same or different $C_1$–$C_8$ hydrocarbon radicals and X is a halogen, such as bromine or chlorine, or an alkoxy, phenoxy or hydroxyl group. Examples of $R_4M$ are tetramethyl ammonium, tetraethyl ammonium or tetrabutyl ammonium and the corresponding phosphonium ions. Preferred catalysts are tetraalkyl ammonium halides and hydroxides and especially tetraethyl ammonium bromide and tetramethyl ammonium hydroxide. Other suitable catalysts are indicated on Table 1 below.

The amount of catalyst generally required can be anything from a molar ratio of 0.2:1 to 0.0001:1 of catalyst to anhydride. However, for most purposes a molar ratio of from 0.01:1 to 0.001:1 of catalyst to anhydride is adequate.

When the anhydride component is an unsaturated anhydride such as maleic anhydride, it is found that the tendency of the polymer to crosslink across the unsaturated linkage can be controlled by the introduction of water into the reaction mixture. In the event the anhydride is not unsaturated, e.g., when phthalic anhydride is used, it is found that the presence of a certain amount of water helps by initiating the reaction and thereafter actually retards the reaction. Thus the presence of water, although not required, may be desired in certain instances, and the amount in which it is present depends on the nature of the anhydride used and the properties of the polyester desired. In practice for both types of anhydrides the water level can vary in the range of 0 to 0.2 mole per mole of anhydride. Generally when an unsaturated anhydride is used to prepare an unsaturated polyester, water is preferred and the amount of water present in the reaction mixture is from 0.075 to 0.20 mole per mole of anhydride.

When the anhydride is unsaturated, such as maleic anhydride, the polymer obtained is conventionally dissolved in styrene, or some other copolymerization monomer, and polymerized to produce a highly cross-linked mass. With the present process it is possible to form the polyester in the presence of the copolymerizable monomer without cross-linking occurring until a specific catalyst, usually a peroxide such as di-tertiary butyl peroxide or cumyl peroxide, is added to the reaction mixture. This is a preferred feature of one aspect of the invention.

When an unsaturated polyester is cross-linked with, for example, styrene as described above, a hard, rigid matrix is formed and this can be used to support glass-fibres (to produce "fiberglass") or a coarse filler material such as sand to produce polymer concrete.

Of course, many other fillers can be used with saturated, unsaturated or cross-linked polyesters to produce a range of products with a wide variety of end uses.

The reaction is performed under closely defined conditions of time and temperature, and these are significant in achieving the desired result.

The polymers of the invention are prepared by a process characterized by a very rapid self-sustaining exothermic stage. Now the exothermic nature of the epoxide/anhydride reaction has been recognized in the past and attempts have been made to curb this heat evolution. Thus, the reaction vessel has been equipped with cooling devices such as cooling coils, the epoxide reactants has been added in stages and the reaction has been conducted in the presence of a diluent serving as a heat sink.

It has now been found, however, that the molecular weight of the polymer in the final product (as reflected by the acid number of the final product) is dependent on the time between the initiation of a non-self-sustaining exothermic reaction and the point at which the exothermic reaction becomes self-sustaining and also on the time from the initiation of the self-sustaining reaction to the attainment of the maximum temperature reached and therefore on whether any cooling has occurred prior to that point sufficient to reverse the rate of temperature change. Thus, in a preferred form of reaction, the reactants are mixed and the temperature raised as quickly as possible to above the point at which the self-sustaining exothermic reaction is initiated and thereafter allowed to proceed without significant cooling at least until a peak temperature in excess of 200° C. has been reached.

As a matter of practice, it is preferred that for most reactant combinations, the reaction mass is heated to above the temperature at which the rapid self-sustaining exothermic reaction proceeds without need for further heating, in up to 200 seconds such as up to about 160 seconds and more preferably from about 45 to 60 seconds.

The time for the reaction mixture to reach its maximum temperature, measured from the time the self-sustaining reaction is initiated is less than 200 and preferably less than 100 seconds. Frequently, only about 30 to 60 seconds or less are required.

Of course, a limited amount of cooling may be permitted, but anything that reverses the rate of temperature change or prolongs the attainment of the maximum temperature leads to an increased acid number in the final product and, therefore, a lower molecular weight of the individual polymer molecules.

The maximum temperature reached is also an important feature of the process of the invention since a maximum of about 200° C. or less, achieved by controlling the temperature profile of the reaction by cooling means (and incidentally prolonging the time for attainment of the maximum temperature thereby) results in a higher acid number in the final product. Thus, the maximum temperature reached is in excess of 200° C. and preferably 220° C. or more.

In reactions of the sort described above, it is conventional to use a glycol as an initiator. This is often desirable in the process of the present invention also but it is found that, using a catalytically effective quaternary salt (as the term is used herein), the effect of a glycol such as styrene glycol is relatively minor.

SPECIFIC EMBODIMENTS

The invention is further described with reference to the following examples which set forth the characteristic features of the polymers prepared by the process of the invention.

EXAMPLE 1

This Example illustrates the effect of various quaternary salt catalysts on the course of a reaction between styrene oxide and phthalic anhydride in an oxide to anhydride to salt ratio of 1.3:1.0:0.17. The reaction mixture was heated to 180° C. at atmospheric pressure and the course of the reaction plotted in each case.

This Example utilizes the conditions specified for evaluation of "catalytically effective quaternary salts" and is therefore an indication of the kind of salts that are embraced by that term. The results are set out in Table 1 below. Runs 1–12, 27 and 28 are illustrative of the invention and the rest are for the purpose of comparison. In each case the run took 15 minutes except where indicated by a prime in which case the run was completed inside 5 minutes. In the table "EXOTHERMIC STAGE" is used for brevity to indicate the self-sustaining exothermic reaction.

This example illustrates the effect of varying the polymerization conditions of the reaction producing polyesters.

EXAMPLE 2

A stock solution having the following molar composition was prepared:

| | |
|---|---|
| Maleic anhydride | 100 moles |
| Styrene oxide | 130 moles |
| Styrene glycol | 3.7 moles |
| Tetramethyl ammonium hydroxide | 0.84 moles |
| Water | 12.7 moles |

Five grams of the stock solution were placed in each of nine test tubes (20×150 mm) along with two or three boiling chips. A thermometer was placed in each test tube and each was placed in an oil bath at 155° C.

a. The first tube showed a strongly exothermic self-sustaining reaction after 61 seconds when a temperature of 99° C. had been reached. After 100 seconds a maximum temperature of 208° C. was reached. After 12 minutes the temperature had declined to 155° C. After 15 minutes the sample was removed from the tube and was found to be a dark brown, acetone-soluble product with an acid number of 54.

b. The second tube was removed from the oil bath after 61 seconds and placed in a holder at room temperature. The reaction mass reached a temperature maximum of 206° C. after 90 seconds and cooled to 167° C. after 3 minutes. The tube was then put back in the oil bath until a total reaction time of 15 minutes had been reached. The product obtained had an acid number of 50.

TABLE 1

| Run No. | Catalyst | Time to Exothermic Stage, Sec. | Threshold of Exothermic Stage, °C | Time from Threshold to Max. Temp., Sec | Max. Temp. °C | Acid No. | Polymer Melt °C | Rating of Catalyst |
|---|---|---|---|---|---|---|---|---|
| 1 | $(CH_3)_4NOH \cdot 5H_2O$ | 73 | 160 | 27 | 235 | 55 | 72 | G |
| 2 | $(Et)_4 NO\phi$ | 110 | 170 | 30 | 237 | 13 | 79 | G |
| 3 | $(CH_3)_4 NCl$ | 110 | 178 | 40 | 235 | 25 | 75 | G |
| 4 | $(Bu)_4 NCl$ | 90 | 175 | 30 | 235 | 33 | n.d. | G |
| 5 | $(Et)_3 (\phi CH_2)NCl$ | 125 | 180 | 45 | 230 | 32 | 83 | G |
| 6 | $(CH_3)_4NBr$ | 150 | 190 | 45 | 232 | 63 | 66 | G |
| 7 | $(Et)_4NBr$ | 95 | 170 | 25 | 232 | 7 | 67 | G |
| 8 | $(Bu)_4NBr$ | 122 | 166 | 28 | 230 | 10 | 65 | G |
| 9 | $(Spiro)NBr$ | 100 | 175 | 30 | 236 | 9 | 83 | G |
| 10 | $(Hept)_4NBr$ | 92 | 175 | 18 | 234 | 18 | 70 | G |
| 11 | $(Oct)_3PrNBr$ | 100 | 175 | 30 | 232 | 27 | 72 | G |
| 12[1] | $CH_2(CH_3)_3NBr$ | 160 | 185 | 30 | 229 | 65 | n.d. | G |
| 13 | $(CH_3)_4 NI$ | 105 | 183 | 30 | 237 | 66 | 60 | B |
| 14 | $(Bu)_4 NI$ | 85 | 165 | 25 | 235 | 119 | n.d. | U |
| 15 | $(Pent)_4 NI$ | 110 | 170 | 25 | 235 | 73 | n.d. | U |
| 16 | $(Hex)_4 NI$ | 110 | 160 | 25 | 233 | 90 | L.R.T. | U |
| 17 | $(Hept)_4 NI$ | 115 | 160 | 30 | 233 | 93 | L.R.T. | U |
| 18 | $(CH_3)_3\phi N\ Cl$ | 180 | 186 | 150 | 205 | 63 | L.R.T. | U |
| 19 | $(CH_3)_3\phi N\ Br$ | 180 | 193 | 180 | 211 | 61 | L.R.T. | U |
| 20 | $(CH_3)_3\phi NI$ | 150 | 187 | 120 | 207 | 88 | L.R.T. | U |
| 21 | $(Et)_4 N\ B\ F_4$ | 115 | 170 | 17 | 243 | 86 | 58 | B |
| 22 | $(Bu)_4 N\ P\ F_6$ | 210 | 185 | 95 | 239 | 122 | 65 | U |
| 23' | $(BrCH_2CH_2)(CH_3)_3\ N\ Br$ | 180 | 180 | 75 | 228 | 68 | n.d. | U |
| 24[1] | $\phi CH_2(CH_3)_2\ N^*$ | 150 | 188 | 75 | 210 | 56 | n.d. | U |
| 25[1] | $\phi CH_2(CH\ 3)_2\ N \cdot \phi\ CH_2OH^*$ | 155 | 190 | 15 | 210 | 41 | n.d. | B |
| 26[1] | $\phi CH_2(CH_3)_2\ N \cdot \phi\ CH_2Br^*$ | 120 | 145 | 50 | 208 | 24 | n.d. | B |
| 27[1] | $\phi\ CH_2\ (\phi)_3\ P\ Cl$ | 100 | 138 | 10 | 230 | 12 | n.d. | G |
| 28[1] | $Bu\ (\phi)_3\ P\ Br$ | 105 | 130 | 25 | 232 | 14 | n.d. | G |
| 29 | $Zn(OAc)_2 \cdot 2H_2O$ | 45 | 100 | 30 | 210 | 288 | L.R.T. | U |
| 30 | $C_6H_5OPO_3Na_2$ | 180 | 183 | 80 | 235 | 86 | n.d. | B |
| 31 | LiCl | 210 | 182 | 210 | 225 | 87 | n.d. | U |
| 32 | LiBr | 210 | 186 | 150 | 225 | 110 | L.R.T. | U |
| 33 | $MgCO_3(N.F.)$ | 240 | 186 | 120 | 221 | 287 | L.R.T. | U |
| 34 | None | 300 | 184 | 540 | 193 | 254 | L.R.T. | U |

Rating Code
G = Good
B = Borderline
U = Unsatisfactory
*Unreacted monomer present c. The tube was removed from the oil bath at the same time as "b." but was instead placed in a water bath at 22° C. The reaction mass reached 110° C. but then cooled to below 100° C. After 5.5 minutes the tube was replaced in the oil bath. After a further minute, a self-sustaining exothermic reaction had been initiated that increased the temperature to 186° C. After ten minutes the mass had cooled to 174° C. and fifteen minutes after the start of the reaction the product was removed from the oil bath and was found to be a dark brown solid with an acid number of 80.

d. This sample was treated exactly as "c." except that on removal from the oil bath the tube was held in air while the temperature rose to 150° C. (a period of 12 seconds) before being placed in the water bath. The reaction mass reached a peak temperature of 195° C. while in the water bath. After 2.5 minutes the tube was placed back in the oil bath until a reaction time of 15 minutes had been reached. The dark brown product was removed from the tube and found to have an acid number of 77.

e. This sample was treated in exactly the same manner as "c." except that the temperature was allowed to rise in air to 125° C. (9 seconds) before being placed in the water bath. A maximum temperature of 195° C. was reached in the water bath. After 2.5 minutes the tube was replaced in the oil bath until 15 minutes reaction time had been reached. The dark brown product had an acid number of 76.

f. This sample was removed from the oil bath when the temperature had reached 100° C., (after 70 seconds), and was placed in a holder at room temperature. The mixture reached a maximum of 208° C. in 100 seconds. After four minutes the mass had cooled to 150° C. and samples were removed for analysis. The dark brown product had an acid number of 62.

g. This sample was removed from the oil bath when the temperature had reached 80° C., (after 54 seconds), and was placed in a holder at room temperature. The reaction mixture reached a peak temperature of 185° C. after 180 seconds. After four minutes the sample had cooled to 160° C. and samples were taken for analysis. The dark brown product had an acid number of 76.

h. This sample was treated in exactly the same way as "g." except that the tube was removed from the oil bath when the temperature had reached 70° C., (after 46 seconds). The maximum temperature of 200° C. was reached after 130 seconds. After the four minutes the reaction mass had cooled to 159° C. and samples taken showed an acid number of 73.

i. This sample was treated exactly as was "g." except that the tube was removed from the oil bath after 30 seconds when the temperature had reached 60° C. The reaction mass reached a temperature maximum of 70° C. and began cooling. The tube was placed back in the oil bath after 180 seconds and the reaction mass reached a maximum temperature of 183° C. after 6.3 minutes. After 8 minutes the reaction mass was at 158° C. and the tube was removed from the oil bath. The acid number of the product was 72.

From this Example it can be seen that artificially limiting the maximum temperature reached or stopping the reaction and re-starting after a period of cooling has the effect of increasing the acid number.

EXAMPLE 3

In this Example, the effect of using a styrene glycol initiator is demonstrated and the advantage of using a more rapid initial heat-up phase is shown by comparison of the results obtained with those in Example 2.

a. Five grams of the same stock solution as was used in Example 2 were placed in a test tube which was in turn placed in an oil bath at 185° C. A rapid self-sustaining exothermic reaction began after 40 seconds at which time the tube was removed from the oil bath. A maximum temperature in excess of 200° C. was reached and after 90 seconds the tube was returned to the oil bath for fifteen minutes. The product had an acid number of 30.

b. The above experiment was repeated using a reaction mixture of the same composition except that the styrene glycol was omitted. The product obtained had an acid number of 33.

Thus, from the comparison of Examples 2 and 3, the effect of a more rapid kick-off of the self-sustaining exothermic reaction can be seen to be a lower acid number in the final product. In addition, it is clear that, with the reaction mixture used, the effect of the glycol initiator is not great.

EXAMPLE 4

This Example demonstrates the effect of water on the acid number of the product when the anhydride is phthalic anhydride.

Each of the stock reactant mixtures indicated below in Table 2 was charged into a 20mm × 150mm test tube along with a few boiling chips and a thermometer was placed inside the test tube to monitor the temperature of the reaction mass. Each tube was then placed in an oil bath at 180° C. for 15 minutes. The results are indicated in Table 2.

TABLE 2

| Run | CHARGE IN MOLES | | | | | Max. Temp (° C) | Total Time to Max. Temp. (Sec.) | Polymer Melt Temp. | Acid No. |
| | Styrene Oxide | Phthalic Anhydride | TMAB | TMAH | Water | | | | |
| --- | --- | --- | --- | --- | --- | --- | --- | --- | --- |
| a | 130 | 100 | 2 | — | 0 | 230 | 220 | 78 | 33 |
| b | 130 | 100 | 2 | — | 12.5 | 252 | 150 | 60 | 47 |
| c | 130 | 100 | 2 | — | 25 | 220 | 80 | 52 | 77 |
| d | 130 | 100 | 2 | — | 50 | 195 | 120 | 50 | 130 |
| e | 130 | 100 | — | 2 | 9.5 | 235 | 165 | 70 | 31 |
| f | 130 | 100 | — | 2 | 31 | 220 | 90 | 53 | 95 |
| g | 130 | 100 | — | 2 | 50 | 195 | 105 | 45 | 118 |

TABLE 2-continued

| Run | CHARGE IN MOLES | | | | | Max. Temp (°C) | Total Time to Max. Temp. (Sec.) | Polymer Melt Temp. | Acid No. |
| | Styrene Oxide | Phthalic Anhydride | TMAB | TMAH | Water | | | | |
| --- | --- | --- | --- | --- | --- | --- | --- | --- | --- |
| h | 130 | 100 | — | — | — | 195 | 900 | 90 | 295 |

Note:
TMAB is tetramethylammonium bromide.
TMAH is tetramethylammonium hydroxide.

It can be seen from the results obtained that the effect of water is to increase the acid number and to decrease the polymer melt temperature. It is important therefore for the above reaction system to control the water content in the system.

EXAMPLE 5

This Example shows the effect of water but this time in the absence of a monomer copolymerizable with the unsaturated ester product.

a. To a 20mm × 150mm test tube were charged 5 grams of a stock solution having the following composition:

| | | |
| --- | --- | --- |
| | styrene oxide | 130 moles |
| | maleic anhydride | 100 moles |
| | water | 5.1 moles |
| | tetramethyl ammonium hydroxide | 0.35 moles |

The test tube was immersed in an oil bath at 180° C. until a fast self-sustaining exothermic reaction had been initiated after approximately 45 seconds. The tube was then removed from the bath and placed in a holder at room temperature until after a maximum temperature in excess of 200° C. had been reached and the reaction had subsided. The tube was then placed back in the bath for a total run time of 15 minutes. The produce was cross-linked and insoluble in styrene. A repeat of this run produced the same result.

b. Run "a" was repeated except that 10.6 moles of water and 0.7 mole of tetramethyl ammonium hydroxide were used. The product was dissolved in styrene to give a 70 wt. % polyester in styrene solution which was then cross-linked using a conventional free-radical catalyst to produce a hard cross-linked product.

This Example clearly shows the advantage of some water in preventing cross-linking of unsaturated polyesters during production.

EXAMPLE 6

This Example illustrates a method of producing an unsaturated polyester with a predominately fumarate structure.

A stock solution was prepared with the composition:

| | | |
| --- | --- | --- |
| | maleic anhydride | 100 moles |
| | styrene oxide | 130 moles |
| | styrene glycol | 3.6 moles |

These runs were performed using 5.0 grams of the stock solution plus the additives indicated below. In each case the solution was placed in a boiling tube which was then placed in an oil bath at 190° C. for 15 minutes. In the case of runs b, c and d the tube was removed from the oil bath after about 40 seconds when a strong self-sustaining exothermic reaction had been initiated and returned to the bath after about 90 seconds after a maximum temperature in excess of 200° C. had been reached and the reaction had subsided. The results are indicated on Table 3.

TABLE 3

| Run | TMAH (Moles) | Morpholine (Moles) | Water (Moles) | Acid No. | Fumarate Content (%) |
| --- | --- | --- | --- | --- | --- |
| a | — | — | — | 266 | < 25% |
| b | 5.1 | — | — | 53 | < 25% |
| c | — | 5.8 | — | 145 | > 90% |
| d | 5.1 | 5.8 | 10.7 | 56 | about 75% |

From this run it can be seen that it is possible to use a conventional isomerization catalyst such as morpholine during the formation of the unsaturated polyester in spite of the great speed with which the reaction proceeds.

The above Examples are intended for use as illustration only of the general principles underlying the invention. It will be obvious to one moderately skilled in the art that many variations to and modifications of the processes described herein could be made without departing from the essential character of the invention, such as the incorporation of conventional antioxidants, stabilizers, coloring material and the use of conventional techniques for rendering the product flame-retardant. It is intended that all such modifications and variations should be included within the full scope of the invention.

What is claimed is:

1. A process for the production of a polyester having an acid number which is not greater than 65 which comprises:
   a. forming a mixture of a diacid anhydride with a monoterminal epoxide in an anhydride to epoxide molar ratio of from 1:1 to 1:1.5 in the presence of from 0.2 to 0.0001 mole per mole of anhydride of a catalytically effective quaternary salt and, optionally, in the presence of up to 0.2 mole per mole of anhydride of water,
   b. initiating a non-self-sustaining exothermic reaction between the epoxide and the anhydride,
   c. raising the temperature of the mixture to a point at which the exothermic reaction becomes self-sustaining, and
   d. controlling the reaction conditions such that the temperature of the reaction mixture is not reduced until a peak temperature in excess of 200° C. has been reached in the reaction mixture and substantially all available monomer has been consumed;
   the time spent in stages b and c combined being less than 200 sec. and the time taken in stage d from the initiation of the self-sustaining exothermic reaction to the attainment of the peak temperature being also less than 200 seconds.

2. A process according to claim 1 wherein said polyester has a polymer melt temperature of at least 50° C., said diacid anhydride is an unsaturated dicarboxylic acid anhydride, and water is present in an amount of from 0.075 to 0.20 mole of water per mole of anhydride.

3. A process according to claim 2 wherein said anhydride is maleic anhydride.

4. A process according to claim 2 wherein said epoxide is styrene oxide.

5. A process according to claim 2 wherein said anhydride is maleic anhydride and said epoxide is styrene oxide, the time spent in stages $b$ and $c$ combined being less than 160 seconds and the time for the initiation of the self-sustaining exothermic reaction to the time the peak temperature is reached is less than 100 seconds.

6. A process according to claim 5 wherein the reaction is carried out in the presence of a maleate ester isomerization catalyst.

7. A process according to claim 5 wherein the reaction mixture contains from 0.01 to 0.10 mole of morpholine per mole of anhydride.

8. A process according to claim 5 wherein the catalytically effective quaternary salt is one having the formula $R_4MX$, wherein the R groups are the same or different $C_1$-$C_8$ hydrocarbon radicals, M is N or P and X is a bromine or chlorine, or an alkoxy, hydroxyl or phenoxy group.

9. A process according to claim 8 wherein the quaternary salt is selected from tetramethyl ammonium bromide, tetramethyl ammonium hydroxide, tetraethyl ammonium bromide and tetraethyl ammonium hydroxide.

10. A process according to claim 1 wherein said diacid anhydride is an aromatic dicarboxylic acid anhydride.

11. A process according to claim 10 wherein said aromatic dicarboxylic acid anhydride is phthalic anhydride.

12. A process according to claim 10 wherein said epoxide is styrene oxide.

13. A process according to claim 10 wherein said catalytically effective quaternary salt is one having the formula $R_4MX$, wherein the R groups are the same or different $C_1$-$C_8$ hdyrocarbon radicals, M is N or P and X is bromine or chlorine, or an alkoxy, hydroxyl or phenoxy group.

14. A process according to claim 13 wherein said quaternary salt is selected from tetramethyl ammonium bromide, tetramethyl ammonium hydroxide, tetraethyl ammonium bromide and tetraethyl ammonium hydroxide.

* * * * *